United States Patent
Cui (10) Patent No.: US 12,452,501 B2
(45) Date of Patent: Oct. 21, 2025

(54) VIDEO LIVE-STREAMING METHOD AND APPARATUS, AND COMPUTER DEVICE AND COMPUTER-READABLE STORAGE MEDIUM

(71) Applicant: E Surfing IoT Co., Ltd, Jiangsu (CN)

(72) Inventor: Ruilin Cui, Jiangsu (CN)

(73) Assignee: E Surfing IoT Co., Ltd, Nanjing (CN)

( * ) Notice: Subject to any disclaimer, the term of this patent is extended or adjusted under 35 U.S.C. 154(b) by 54 days.

(21) Appl. No.: 18/696,396

(22) PCT Filed: Dec. 24, 2021

(86) PCT No.: PCT/CN2021/141173
§ 371 (c)(1),
(2) Date: Mar. 28, 2024

(87) PCT Pub. No.: WO2023/050611
PCT Pub. Date: Apr. 6, 2023

(65) Prior Publication Data
US 2024/0388772 A1    Nov. 21, 2024

(30) Foreign Application Priority Data

Sep. 29, 2021 (CN) .......................... 202111148098.1

(51) Int. Cl.
*H04N 21/858* (2011.01)
*H04N 7/18* (2006.01)
(Continued)

(52) U.S. Cl.
CPC .......... *H04N 21/858* (2013.01); *H04N 7/181* (2013.01); *H04N 21/2187* (2013.01); *H04N 21/23418* (2013.01)

(58) Field of Classification Search
CPC .. H04N 21/858; H04N 7/181; H04N 21/2187; H04N 21/23418
(Continued)

(56) References Cited

U.S. PATENT DOCUMENTS

2017/0171509 A1* 6/2017 Huang .................... H04L 51/04

FOREIGN PATENT DOCUMENTS

| CN | 105898341 A | 8/2016 | |
| CN | 106210754 | * 12/2016 | ......... H04N 21/2187 |
| CN | 106210754 A | 12/2016 | |

OTHER PUBLICATIONS

International Search Report of PCT Patent Application No. PCT/CN2021/141173 issued on Jun. 20, 2022.

* cited by examiner

*Primary Examiner* — Nnenna N Ekpo (57) ABSTRACT

Provided in the present application are a video live-streaming method and apparatus, and a computer device and a computer-readable storage medium. In the present application, on the basis of an initial video, video capture information corresponding to a video that needs to be captured for the initial video is determined, wherein the video capture information includes a preset video capture mobile terminal identifier and video capture requirements; video capture access links are generated according to the video capture requirements, the video capture access links are sent to a preset video capture mobile terminal, such that the preset video capture mobile terminal accesses, on the basis of the video capture access links, a video live-streaming system to which the initial video belongs, target videos are captured, and the target videos are then returned; and the target videos are received, and the target videos are played.

20 Claims, 5 Drawing Sheets

(51) Int. Cl.
*H04N 21/2187* (2011.01)
*H04N 21/234* (2011.01)

(58) Field of Classification Search
USPC .......................................... 725/25, 109–112
See application file for complete search history.

VIDEO LIVE-STREAMING METHOD AND APPARATUS, AND COMPUTER DEVICE AND COMPUTER-READABLE STORAGE MEDIUM

The present application is based on and claims the priority of the Chinese patent application No. 202111148098.1 filed on Sep. 29, 2021, the entire contents of which are hereby incorporated as a whole into the present application.

TECHNICAL FIELD

The present application relates to the technical field of video live-streaming, and in particular to a video live-streaming method and apparatus, a computer device and a computer-readable storage medium.

BACKGROUND ART

During video live-streaming, a video capture device, such as a video camera or camera head, is typically used to capture video at a fixed location and live stream the video by a display screen. For example, in the technical field of video monitoring, with regard to a monitoring point, a camera is generally installed at a certain position of the monitoring point according to the experience of an installer of a monitoring device. A video at a certain angle of the monitoring point is captured by the camera, and the video is displayed in a video live-streaming via a monitoring display screen. The video monitoring of the monitoring point is achieved via the video live-streaming picture displayed on the display screen. In addition, in other application scenes of video live, such as a camera for capturing traffic conditions, when taking a video at the video capture point and displaying the video live, the video capture is also performed by a camera at a certain position. The captured video is displayed by the display screen or the display.

The problem that the video capture point cannot display a video at a specific angle or perform panoramic display on the video capture point would exist in such a camera capture video at a certain position, which reduces the quality of video capture and cannot meet the business requirements of video live-streaming, thus resulting in technical problems of poor effect and low efficiency of video live-streaming.

SUMMARY OF THE INVENTION

The present application provides a video live-streaming method and apparatus, a computer device and a computer-readable storage medium, which can solve the technical problem of poor video live-streaming effect in the traditional technology, and in particular can solve the technical problem of poor video monitoring effect in the video monitoring.

In a first aspect, the present application provides a video live-streaming method, comprising: determining, on the basis of an initial video, video capture information corresponding to a video that needs to be captured for the initial video, wherein the video capture information comprises a preset video capture mobile terminal identifier and video capture requirements; a preset video capture mobile terminal corresponding to the preset video capture mobile terminal identifier and a capture terminal of the initial video are different terminals;
generating, according to the video capture requirements, video capture access links corresponding to the video capture requirements, sending the video capture access links to the preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links; wherein the video capture access link comprises the video capture requirements; and receiving the target videos, and playing the target videos.

In a second aspect, the present application also provides a video live-streaming apparatus, comprising: a determination unit configured for determining, on the basis of an initial video, video capture information corresponding to a video that needs to be captured for the initial video, wherein the video capture information comprises a preset video capture mobile terminal identifier and video capture requirements; a preset video capture mobile terminal corresponding to the preset video capture mobile terminal identifier and a capture terminal of the initial video are different terminals; a send unit configured for generating, according to the video capture requirements, video capture access links corresponding to the video capture requirements, sending the video capture access links to the preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links; wherein the video capture access link comprises the video capture requirements; and a receive unit configured for receiving the target videos and playing the target videos.

In a third aspect, the present application also provides a computer device comprising a memory and a processor, wherein the memory has stored thereon computer programs; and the processor implements the steps of the video live-streaming method when executing the computer programs.

In a fourth aspect, the present application also provides a computer-readable storage medium storing computer programs which, when executed by a processor, causes the processor to perform the steps of the video live-streaming method.

The present application provides a video live-streaming method and apparatus, and a computer device and a computer-readable storage medium. The present application determines, on the basis of an initial video, video capture information corresponding to a video that needs to be captured for the initial video, wherein the video capture information comprises a preset video capture mobile terminal identifier and video capture requirements; a preset video capture mobile terminal corresponding to the preset video capture mobile terminal identifier and a capture terminal of the initial video are different terminals; generates, according to the video capture requirements, video capture access links corresponding to the video capture requirements, sends the video capture access links to a preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links; wherein the video capture access link comprises the video capture requirements; and receives the target videos, and plays the target videos to be able to meet the requirements of video live-streaming and flexibly access a temporary preset video capture mobile terminal at any time so as to increase the preset video capture mobile terminal, thereby obtaining a clearer and more accurate target video, and improving the efficiency and effect of video live-streaming. Especially in the technical field of video monitoring, it can flexibly increases the temporary preset video capture mobile terminal at any time as a temporary monitoring terminal at the monitoring point according to the monitoring requirements of video monitoring, and access the preset video capture mobile terminal to the video monitoring system to which the initial monitoring video belongs based on the video capture access links, which can achieve flexible monitoring video capture at the monitoring point in order to supplement the specific point video required by the initial monitoring video. Thus, a clearer and more accurate target monitoring video can be obtained, and accurate, relatively comprehensive and dynamic video monitoring in a large range can be achieved, so that the monitoring video achieves a clearer and accurate video monitoring effect, which improves the timeliness, flexibility, effect and efficiency of video monitoring, and improves the intelligent application capability of video monitoring.

BRIEF DESCRIPTION OF THE DRAWINGS

In order to more clearly illustrate the technical solutions in the embodiments of the present application, the drawings to be used in the description of the embodiments will be briefly introduced below. Obviously, the drawings in the description below are some embodiments of the present application. It will be apparent to those skilled in the art to obtain other drawings according to these drawings without involving any inventive effort.

DETAILED DESCRIPTION

The technical solutions in the embodiments of the present application will be described clearly and completely in conjunction with the accompanying drawings in the examples of the present application. Obviously, the described examples are only part of the embodiments of the present application, rather than all of the examples. Based on the embodiments in the disclosure, all other embodiments obtained by a person skilled in the art without involving any inventive effort are within the scope of protection of the disclosure.

It will be understood that the terms "include" and "comprise", when used in this description and the appended claims, specify the presence of stated features, integers, steps, operations, elements, and/or components, but do not preclude the presence or addition of one or more other features, integers, steps, operations, elements, components, and/or groups thereof.

Figure 1:
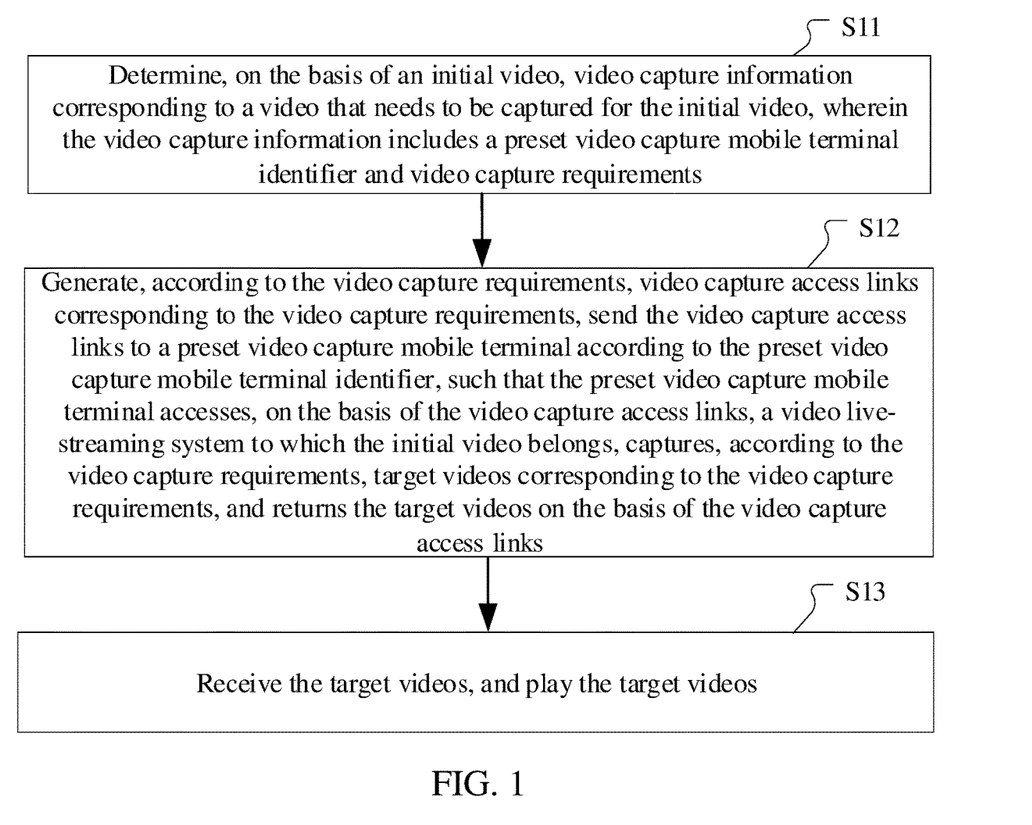
FIG. 1 is a schematic flow diagram of a video live-streaming method provided by an embodiment of the present application.

With reference to FIG. 1, FIG. 1 is a schematic flow diagram of a video live-streaming method provided by an embodiment of the present application. As shown in FIG. 1, the method includes the steps S11-S13 of:

S11, determining, on the basis of an initial video, video capture information corresponding to a video that needs to be captured for the initial video, wherein the video capture information includes a preset video capture mobile terminal identifier and video capture requirements; a preset video capture mobile terminal corresponding to the preset video capture mobile terminal identifier and a capture terminal of the initial video are different terminals.

Specifically, in the field of video live-streaming such as video monitoring, variety show live-streaming and video live-streaming shopping, when performing video live-streaming, a video capture device such as a video camera or a camera is generally used to collect videos at a preset position. Especially when the space range of the video live-streaming is relatively large, a plurality of videos respectively captured by a plurality of video capture devices are played in multiple screens via corresponding display screens, or multiple videos are synthesized into one video live-streaming picture for playing. For example, in the technical field of video monitoring, according to the features that a monitoring area is relatively large and dispersed, the cameras are set at key positions such as a door and a window of the monitoring area. Each path of video captured by each camera is transmitted to a video monitoring room via a wired network or a wireless network. Multi-screen video live-streaming is performed directly via a corresponding display screen on a monitoring screen in the video monitoring room so as to achieve video monitoring. For example, for the monitoring videos used in video monitoring application scenes such as a park, a building, a factory or a vehicle, the initial videos can be obtain by taking a scene picture via the preset camera.

With regard to the initial video, due to the limitation of camera shooting or camera failure, etc. the displayed video picture will be a black screen, a grainy screen, and partially unclear, or the video information needing to be understood is not shot. Therefore, based on the initial video, it can be judged whether there is a video needing to be re-captured by an image recognition algorithm or a failure recognition algorithm. The re-captured video is a video of a certain position, angle or object required. The re-captured video can be an associated video of the initial video. The associated video can be a directly associated video, or an indirectly associated video. Here, for the indirect associated video, for example, in anti-theft alarm video monitoring, if the scene condition cannot be determined according to the video of position A, the scene condition needs to be determined by means of the video condition of position B. However, position B does not have a fixed camera on the scene. The position B is an indirectly associated position of the position A. The video of position B is an indirectly associated video of the video of position A. The re-captured video can be a replacement video or a supplementary video of the initial video, and the replacement video can be an overall replacement video or a partial replacement video. For example, in the case of a black screen or a grainy screen, or in the case of only displaying a local area covered by the camera, in order to replace a video, the supplementary video is a video which is not previously available, and the re-captured video is a newly added video, so that a clearer and more comprehensive live video required by a video service may be obtained, and video contents such as people and objects of the video may be displayed more accurately so as to achieve a better video live-streaming effect, for example, in a video monitoring system, achieving a better video monitoring effect.

Meanwhile, a capture corresponding relationship between the initial video and the preset video capture mobile terminal is pre-established. The capture corresponding relationship is used for describing which corresponding preset video capture mobile terminal performs the capture action of the captured video when the capture video is determined according to the initial video. Thus, a preset video capture mobile terminal for capturing the video can be matched according to the preset capture corresponding relationship when the capture video is determined according to the initial video. The preset video capture mobile terminal can be described by a corresponding preset video capture mobile terminal identifier. According to the initial video, when it is determined that video capture information about a video needs to be re-captured, the video capture information may include a preset video capture mobile terminal identifier for capturing the video. The video capture information may also include video capture requirements. The video capture requirements are used for describing required contents of capturing the video, including required contents such as a capture position, a capture angle or a capture object. The video capture requirements may be described in the form of a capture point photograph, or the video capture requirements are described in the form of a key point video, so that a user of the preset video capture mobile terminal explicitly determines the content of capture videos, the capture point photograph can be used for accurately positioning a video capture position. The key video point can be used for accurately describing video capture requirements such as an capture content and an capture angle.

S12, generating, according to the video capture requirements, video capture access links corresponding to the video capture requirements, sending the video capture access links to the preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links; wherein the video capture access link includes the video capture requirements.

Specifically, after the video capture information is determined, according to the video capture requirements, the video capture access links corresponding to the video capture requirements are generated. According to the preset video capture mobile terminal identifier, the video capture access links are sent to the preset video capture mobile terminal. The video capture access links are used for describing an access mode pf the preset video capture mobile terminal to access the video live-streaming system to which the initial video belongs. The video capture access link can be an IP address. Thus, the video capture access link can be sent to the preset video capture mobile terminal. A common message communication mode can be used for sending the preset video capture access links to the preset video capture mobile terminal. After receiving the video capture access links, the preset video capture mobile terminal opens the video capture access link. The preset video capture mobile terminal can access a video live-streaming system to which the initial video belongs via the video capture access links, and invoke a camera thereof. Later, according to the video capture requirements contained in the video capture access links, a target video corresponding to the video capture requirement is acquired, and the target video is returned based on the video capture access links, where the video capture access links contain the video capture requirements.

In the technical field of video monitoring, if the video monitoring system is a local area network (i.e., an intranet), the IP address can be an intranet IP. The video capture access links are sent to the preset video capture mobile terminal via a wireless network or a wired network of the local area network based on a preset information sending method on the preset video capture mobile terminal, for example, via a preset information sending method such as a preset APP application program. The preset video capture mobile terminal can be a mobile terminal with a video capture function such as a smart phone, a tablet computer, a notebook computer, a smart watch and a smart glasses unmanned aerial vehicle, a robot. The video capture access links include video capture requirements. After receiving the video capture access links, the preset video capture mobile terminal can open the video capture access links based on an application program such as a browser, and access a video monitoring system to which an initial monitoring video belongs based on the video capture access links. The preset video capture mobile terminal calls a camera thereof according to the video capture requirement, and adjusts shooting skills, such as a shooting angle and a shooting position, shooting focal length and shooting range of the preset video capture mobile terminal to clearly and accurately shoot a target video corresponding to the video capture requirement. Later, the target video is returned based on the video capture access links, thereby adding the preset video capture mobile terminal as a temporary monitoring point of a monitored end. The preset video capture mobile terminal may also be a standby video capture terminal. For example, in a place with a relatively high degree of video monitoring requirements such as a treasury, a preset standby video capture terminal can be set, and the preset standby video capture terminal does not access a video monitoring system in normal times. When the preset standby video capture terminal needs to be started, for example, when a main video capture device mainly used has a fault, the preset standby video capture terminal is remotely started to access the video monitoring system by means of a remote control so as to start the preset standby video capture terminal. It does not occupy a lot of video monitoring resources, such as communication bandwidth and display screen, and also start a preset standby video capture terminal at any time when the video capture is needed. In particular, when the preset video capture mobile terminal is used to capture newly added monitoring videos, the flexibility of the mobile video capture terminal to collect videos may be fully utilized to capture required target videos. The full display of effective video information may be realized by the captured target videos. Since it is convenient to add a temporary preset video capture mobile terminal as a video capture point at any time and anywhere according to the monitoring content requirements and monitoring site requirements required for the video monitoring, the required target videos are shot, and the target videos are returned based on the video capture access links. It can quickly capture target videos such as special point videos, especially in park, building, factory and other video monitoring application scenes, and can improve the convenience and efficiency of video monitoring when it is necessary for special point videos to identify vehicles or lock key people and objects and others.

S13, receiving the target videos, and playing the target videos.

Specifically, the target videos are received and the target videos are played, so as to add the target video according to requirements, and a clearer, more comprehensive and more accurate video playing of the video live-streaming can be achieved.

Furthermore, when the target video is played, the target video may be synthesized with the initial video after the target video is received, where a target video frame contained in the target video is synthesized with an initial video frame contained in the initial video, and the synthesis is performed according to the time sequence respectively corresponding to the target video frame and the initial video frame. The target video can replace the initial video, and the target video can also be spliced to the initial video. The target video can also be spliced to a part of the initial video. Also, the target video may also be taken as a contiguous video of the initial video, so that the target video may be taken as a supplementary video of the initial video to obtain a clearer and more complete target live video. The target live video can be live broadcast. The target live video can present video content more clearly and more comprehensively with respect to the initial video, thereby improving the effect of video live-streaming.

For example, in the technical field of video monitoring, a target monitoring video is synthesized with an initial monitoring video to obtain a target live monitoring video. The target live monitoring video is displayed on a monitoring screen, which can display video contents such as people and objects of the monitoring video more clearly and accurately, and can also display a dynamic image of the whole area of the monitoring area, so as to improve the accuracy of analyzing the monitoring video, satisfy the monitoring requirements of video monitoring and realize more effective video monitoring. Especially in the case where the original video monitoring layout is insufficient, by adjusting a video position and a video range of a captured video, it is also possible to adjust a video shooting angle and a shooting range of the preset video capture mobile terminal, such as a smart phone, so as to shoot a key point video which appears an alarm in the video monitoring as a target video, and to synthesize the target video with the initial video so as to supplement the initial video, thereby realizing panoramic video synthesis based on a spatial position. Since the target video can include panoramic and multi-directional video contents, it is possible to solve the monitoring problem that an existing monitoring point cannot display a specific point video or a panoramic display video, so that it is convenient for the monitoring user to control the overall monitoring condition in a certain monitoring space and improve the video monitoring effect. For example, the monitoring video used in the video monitoring application scenes of park, building, factory or vehicle-mounted or customer privatization scenes (such as hazardous chemical product transportation vehicle monitoring of chemical industry park, robot inspection) can provide more effective monitoring target detection, tracking and display according to more effective monitoring videos, especially can realize more accurate intelligent alarm and more effectively prevent abnormal events, thus saving human and material resources for monitoring and avoiding the occurrence of financial losses.

In the embodiments of the present application, a preset video capture mobile terminal which is temporarily used can be flexibly accessed at any time according to the requirements of the video live-streaming, and a target video required is captured by the preset video capture mobile terminal to obtain a clearer and more accurate live-streaming video and improve the efficiency and effect of video live-streaming. Especially in the technical field of video monitoring, it can flexibly increases the temporary preset video capture mobile terminal at any time as a temporary monitoring terminal at the monitoring point according to the monitoring requirements of video monitoring, and access the preset video capture mobile terminal to the video monitoring system to which the initial monitoring video belongs based on the video capture access links, which can achieve flexible monitoring video capture at the monitoring point in order to supplement the specific point video required by the initial monitoring video. Thus, a clearer and more accurate target monitoring video can be obtained, and accurate, relatively comprehensive and dynamic video monitoring in a large range can be achieved, so that the monitoring video achieves a clearer and accurate video monitoring effect, which improves the timeliness, flexibility, effect and efficiency of video monitoring, and improves the intelligent application capability of video monitoring.

Figure 2:
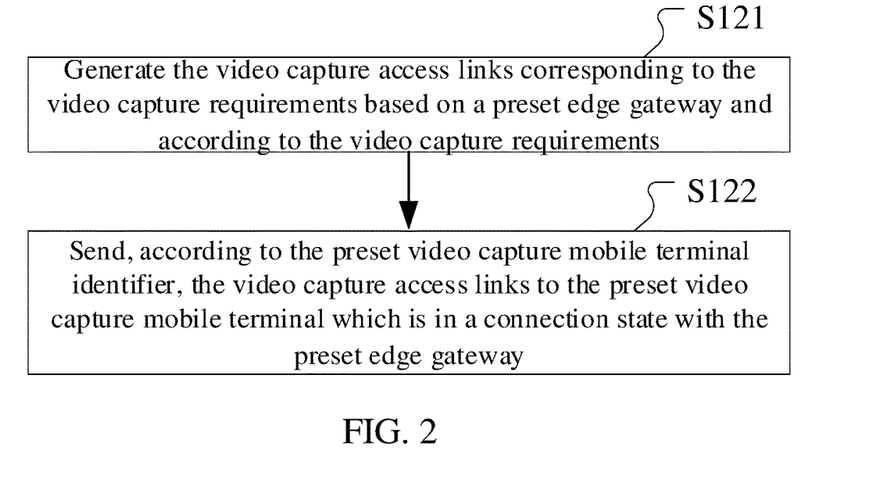
FIG. 2 is a schematic diagram of a first sub-flow of the video live-streaming method provided by an embodiment of the present application.
Figure 3:
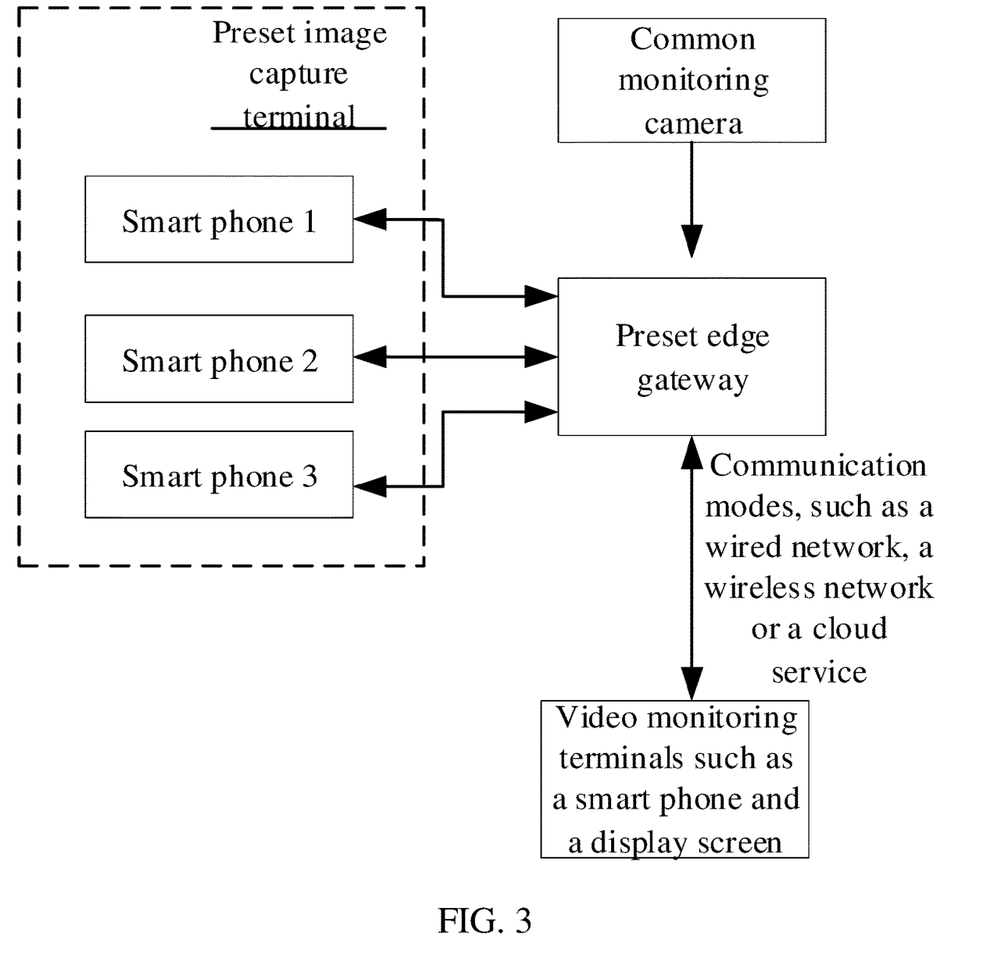
FIG. 3 is a schematic diagram illustrating an example of a video monitoring application scene architecture in a video live-streaming method provided by an embodiment of the present application.

In an embodiment, reference is made to FIGS. 2 and 3. FIG. 2 is a schematic diagram of a first sub-flow of the video live-streaming method provided by an embodiment of the present application. FIG. 3 is a schematic diagram illustrating an example of a video monitoring application scene architecture in a video live-streaming method provided by an embodiment of the present application. As shown in FIGS. 2 and 3, in the embodiment, the generating, according to the video capture requirements, video capture access links corresponding to the video capture requirements, sending the video capture access links to the preset video capture mobile terminal according to the preset video capture mobile terminal identifier includes:

S121, generating the video capture access links corresponding to the video capture requirements based on a preset edge gateway and according to the video capture requirements; and S122, sending, according to the preset video capture mobile terminal identifier, the video capture access links to the preset video capture mobile terminal which is in a connection state with the preset edge gateway.

The edge gateway, which is also referred to as an edge computing gateway or an edge computing gateway of the Internet of Things, is a gateway deployed at an edge side of the network and is an intelligent gateway which can run functions such as local computing, message communication and data cache on a device. It can realize local linkage of the device and data processing and analysis without networking.

Specifically, with reference to FIG. 3, in the technical field of video live-streaming, especially in a video monitoring system, the initial video can be captured on the basis of a pre-installed common monitoring camera, generally, a monitoring camera with a fixed position. It is judged whether supplementary new video needs to be captured on the basis of an initial video frame contained in the initial video. If it is decided that it is not necessary to capture the new video, the video live-streaming can be performed directly according to the processing logic of the initial video. For example, in the technical field of video monitoring, if it is not necessary to capture the new video, based on a preset monitoring video processing logic, the video monitoring can be performed according to the initial video. If it is decided that newly added video needs to be captured, the video capture information corresponding to the video which needs to be captured by the initial video is determined, where the video capture information includes a preset video capture mobile terminal identifier and video capture requirements. Based on the preset edge gateway, according to the video capture requirements, the video capture access links corresponding to the video capture requirements are generated. In the case where there are multiple preset video capture mobile terminals, a capture corresponding relationship between the video which needs to be captured and the preset video capture mobile terminals is pre-matched. Namely, it is predetermined which videos are captured by which corresponding preset video capture mobile terminals. According to the video capture information, it can be determined which preset video capture mobile terminal needs to capture the videos, and the preset video capture mobile terminal identifier of the preset video capture mobile terminal is acquired. The video capture access links are sent to the preset video capture mobile terminal corresponding to the preset video capture mobile terminal identifier. The preset video capture mobile terminal accesses a video live-streaming system to which the initial video belongs via the video capture access links. The preset video capture mobile terminal captures a target video corresponding to the video capture requirement, and uploads the target video. The preset video capture mobile terminal can be, in particular, a terminal closest to a target capture position, and the target capture position is a position corresponding to the target video. For example, in a video monitoring application environment such as a park, a building, a factory, etc. since corresponding security personnel, such as security personnel, are provided at different positions, the preset video capture mobile terminal can be a smart phone used by security personnel. The security personnel may be the security personnel closest to the target capture position, and the efficiency of capturing the target video can be improved. Among them, the preset video capture mobile terminal can be an edge mobile terminal device in the Internet of Things, and the preset video capture mobile terminal can be an edge mobile terminal device in the Internet of Things containing a camera, such as a smart phone, a smart watch, a tablet computer, etc. so as to flexibly access the edge terminal device in the Internet of Things to the video live-streaming system, such as a video monitoring system to which the initial video belongs, which, in particular, can improve the flexibility and timeliness of the video monitoring system capturing a newly added target video, and improve the flexibility and efficiency of supplementing and expanding the initial video.

In particular, based on a video edge gateway, the access capability of cloud edge distribution video image based on a cloud service can be realized. The access, management and scheduling capability of a nearby edge video image capture device is provided, and the fast nearby processing of a video live-streaming service can be realized. Based on Internet of Things communication technologies such as 5G communication, etc. the requirements of low delay and localization can be satisfied. The edge gateway adds a specific video according to the service requirements of the video live-streaming, and sends a video capture access link to a preset video capture mobile terminal near to a video capture position via the edge gateway. Thus, an efficient video application technology is provided by the integration of Internet of Things sensing technology and video technology applications. The video edge gateway, such as an EasyNVR video edge calculation gateway, will process the mass data collected in the camera by means of connecting with the camera terminal, perform sorting and induction, and can perform scheduling via the EasyNVR video edge calculation gateway.

In the embodiment of the present application, by using the edge computing performance of the preset edge gateway, the preset video capture mobile terminal near to the target capture position corresponding to the video to be captured may be flexibly used as an edge application without using a server, and is particularly suitable for an edge application scene. Based on the active video capture of the edge application, the flexibility and timeliness of the target video capture may be achieved. With regard to video monitoring, the preset video capture mobile terminal can be connected to the video monitoring system to which the initial video belongs according to the requirements of capturing a monitoring video. With the aid of the communication performance of a large flow and a low time delay provided by a communication network such as a 5G network, the terminal performance and the communication network performance under the condition of the Internet of Things can be fully utilized. An edge system is used to realize a service of local production and local termination, and has the capability of local distribution, and local deployment of a service application. The omni-directional video display of a video monitoring point and the composite collision of video information can be realized so as to facilitate the intelligent application of the video monitoring system. In order to improve the video monitoring effect, especially in the video monitoring application scenes such as a park, a building, a factory or a vehicle, using the video monitoring based on the Internet of Things can quickly deploy and realize a comprehensive and overall intelligent video monitoring application deployment, and can improve the monitoring effect and efficiency of video monitoring without using a server. It can reduce the hardware deployment required to build the video monitoring system and reduce the cost of building the video monitoring system.

In an embodiment, a plurality of the video capture requirements are included. In this embodiment, the generating the video capture access links corresponding to the video capture requirements according to the video capture requirements includes:

generating the video capture access link corresponding to each of the video capture requirements in parallel according to each of the video capture requirements, wherein each of the video capture access links includes a corresponding video capture requirement.

Specifically, with regard to a multi-screen video live-streaming application scene with a plurality of video pictures, especially in the technical field of video monitoring, when monitoring a plurality of areas via a large screen for video monitoring, the large screen for video monitoring would include a plurality of display screens, each display screen displaying one path of monitoring video pictures, each path of monitoring video pictures corresponding to one camera, each camera corresponding to a shooting video at one angle. Each display screen would correspond to a respective initial video.

In the case where there are a plurality of paths of monitoring videos, there will be a case where a plurality of videos need to be captured. Each video needing to be captured corresponds to respective video capture information. At this time, the video capture information includes a plurality of video capture information, where each video capture information corresponds to one path of monitoring videos, especially in video monitoring application scenes such as parks, buildings and factory areas. Each path of monitoring videos corresponds to a spatial region at a different position. The video capture access links corresponding to each of the video capture requirements can be generated in parallel according to the video capture requirements contained in each of the video capture information, where each of the video capture access links contains a corresponding video capture requirement, and each of the video capture access links is sent to a preset video capture mobile terminal corresponding to the preset video identifier, so that all of the video capture access links are sent to different preset video capture mobile terminals. Thus, each of the preset video capture mobile terminals processes video capture respectively corresponding thereto in parallel. A plurality of target videos respectively corresponding to the video capture information are processed in parallel via a plurality of preset video capture mobile terminals. The video monitoring system may automatically start a plurality of monitoring point videos corresponding to a panoramic view, realizing comprehensive monitoring regional video, which can improve the processing efficiency of multi-channel monitoring video and thereby improve the efficiency of video monitoring. For example, with continuing reference to FIG. 3, a smart phone 1, the smart phone 2 and a smart phone 3 may be distributed in different monitoring areas. The smart phone 1, the smart phone 2 and the smart phone 3 process target videos corresponding to video capture information respectively in parallel, and may automatically trigger multiple front-end smart phones to transmit target videos corresponding to each simultaneously, so that the smart phone serves as an edge monitoring point of the mobile phone, and the smart phone serves as a temporary activity monitoring point to access an edge gateway so as to supplement the target videos. After splicing and integrating the target videos with initial videos corresponding to each other, automatic realization of the overall video of multiple monitoring points can achieve video monitoring from a more comprehensive, clearer perspective, and improve the overall video monitoring efficiency and monitoring effect.

Figure 4:
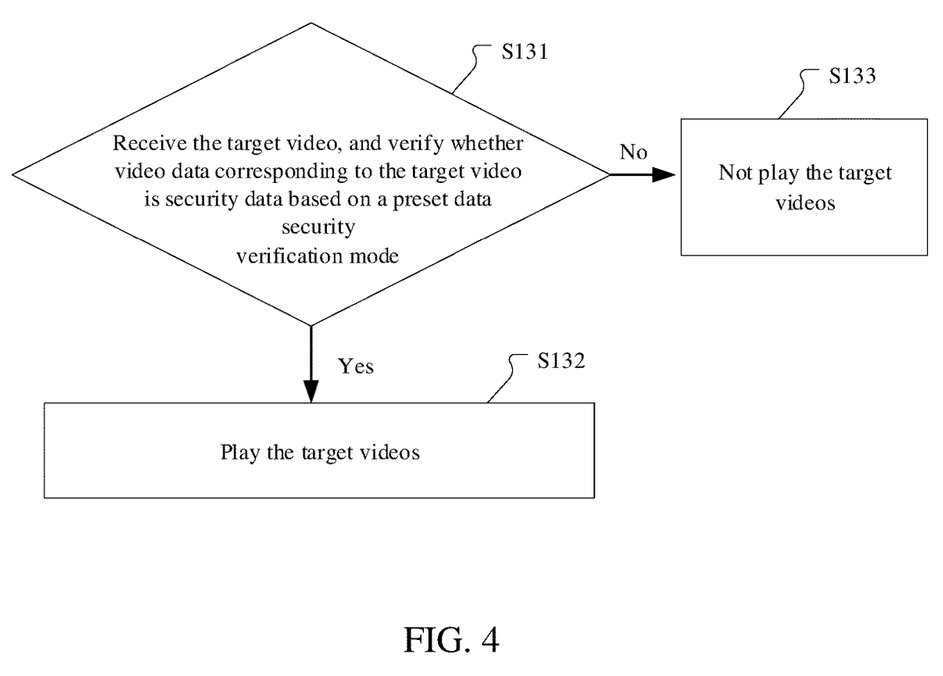
FIG. 4 is a schematic diagram of a second sub-flow of the video live-streaming method provided by an embodiment of the present application.

In an embodiment, referring to FIG. 4, FIG. 4 is a schematic diagram of a second sub-flow of the video live-streaming method provided by an embodiment of the present application. As shown in FIG. 4. In the embodiment, the receiving the target videos and playing the target videos includes:

S131, receiving the target video, and verifying whether video data corresponding to the target video is security data based on a preset data security verification mode;

S132, if the video data is the security data, playing the target videos; and

S133, if the video data is insecure data, not playing the target videos.

Specifically, especially in the technical field of video monitoring, in order to ensure the security of video data corresponding to the target video, so as to ensure the effect of video monitoring, the security verification may be performed on the video data corresponding to the target video. After receiving the target video, based on the preset data security verification mode, whether the video data corresponding to the target video is security data may be verified by encrypting and decrypting a corresponding preset data security verification mode based on encryption and decryption, and also by a preset data security verification mode based on verifying the consistency of a random code. If the video data is security data, the target videos are played. If the video data is insecure data, the target videos are not played. In addition, if the video data is insecure data, a preset alarm may further be adopted to alarm the insecurity of the target videos so as to remind monitoring personnel to perform verification processing. Furthermore, if the video data corresponding to the target video is insecure data, a video re-capture instruction may also be sent to the preset video capture mobile terminal. The video re-capture instruction is used for describing an indication of re-capturing the target video corresponding to the video capture requirement, so as to enable a terminal user corresponding to the preset video capture mobile terminal to re-capture the target videos meeting the expectation. By ensuring the security of the target videos, the effect of video monitoring is improved, especially in financial institutions such as banks and other application places with relatively high security requirements. The security of monitoring video may be improved to ensure the effect of video monitoring.

Figures 5, 6:
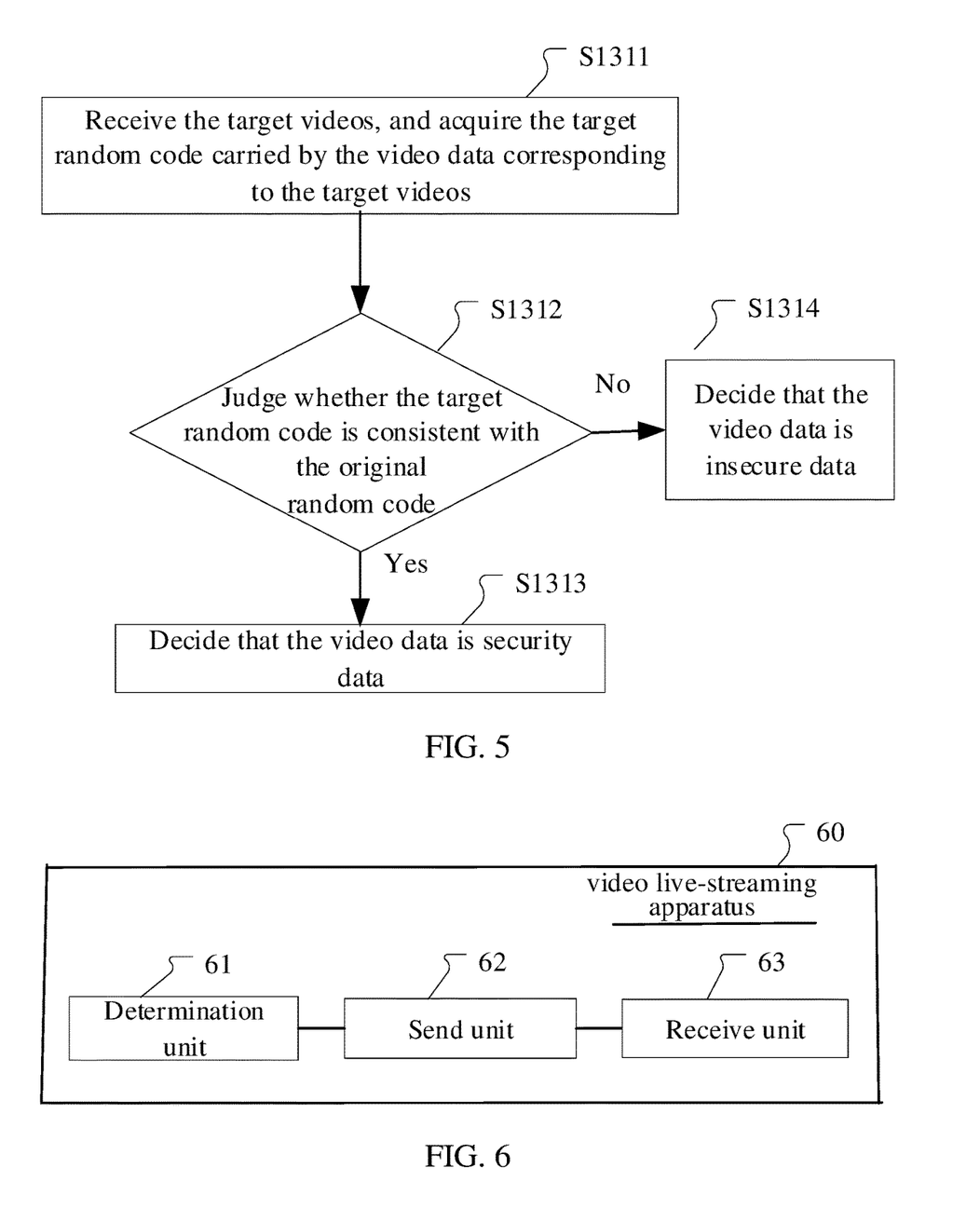
FIG. 5 is a schematic diagram of a third sub-flow of the video live-streaming method provided in an embodiment of the present application.
FIG. 6 is a schematic block diagram of a video live-streaming apparatus provided by an embodiment of the present application.

Furthermore, referring to FIG. 5, FIG. 5 is a schematic diagram of a third sub-flow of the video live-streaming method provided in an embodiment of the present application. In the embodiment, the video capture access link includes an original random code, and the receiving the target video and verifying whether video data corresponding to the target video is security data based on a preset data security verification mode includes:

S1311, receiving the target videos, and acquiring the target random code carried by the video data corresponding to the target videos;

S1312, judging whether the target random code is consistent with the original random code;

S1313, if the target random code is consistent with the original random code, deciding that the video data is security data; and S1314, if the target random code is not consistent with the original random code, deciding that the video data is insecure data.

Specifically, in order to ensure the security of the received target video, whether the video data corresponding to the target video is security data may be verified by means of the preset data security verification mode based on verifying the consistency of the random code. When implementing, according to the video capture requirements, when generating video capture access links corresponding to the video capture requirements, the original random code corresponding to the video capture information may be randomly generated, namely, the original random code corresponding to the video capture access link. The original random code is reserved. At the same time, the original random code is sent with the video capture access links to the preset video capture mobile terminal corresponding to the preset video identification. When the preset video capture mobile terminal returns a target video corresponding to the video capture information, the original random code contained in the video capture access link is returned together as a target random code. After receiving video data corresponding to the target video, the target random code carried by the video data is acquired. It is judged whether the target random code is consistent with the original random code. If the target random code is consistent with the original random code, it is decided that the video data is security data, and the target videos are played. If the target random code is inconsistent with the original random code, it is decided that the video data is insecure data, and the target videos are not played.

Due to the high efficiency and simplicity of random code consistency verification, the verification efficiency of verifying whether the target videos are security data may be improved while ensuring the security of the target videos.

It should be noted that the video live-streaming method described in the above-mentioned various embodiments may re-combine the technical features contained in different embodiments according to needs so as to obtain a combined embodiment, but all fall within the scope of protection claimed in the present application.

With reference to FIG. 6, FIG. 6 is a schematic block diagram of a video live-streaming apparatus provided by an embodiment of the present application. Embodiments of the present application also provide a video live-streaming apparatus corresponding to the video live-streaming method described above. As shown in FIG. 6, the video live-streaming apparatus, which includes a unit for performing the video live-streaming method described above, may be configured in a computer device such as an edge gateway. Specifically, referring to FIG. 6, the video live-streaming apparatus 60 includes a determination unit 61, a send unit 62, and a receive unit 63.

The determination unit 61 is configured for determining, on the basis of an initial video, video capture information corresponding to a video that needs to be captured for the initial video, wherein the video capture information includes a preset video capture mobile terminal identifier and video capture requirements; a preset video capture mobile terminal corresponding to the preset video capture mobile terminal identifier and a capture terminal of the initial video are different terminals.

The send unit 62 is configured for generating, according to the video capture requirements, video capture access links corresponding to the video capture requirements, sending the video capture access links to the preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links; wherein the video capture access link includes the video capture requirements.

The receive unit 63 is configured for receiving the target videos and playing the target videos.

In an embodiment, the receive unit 63 is configured for receiving the target videos and synthesizing the target videos with the initial video to obtain a target live video, and live broadcasting the target live video.

In an embodiment, the send unit 62 includes:
a generation subunit configured for generating the video capture access links corresponding to the video capture requirements based on a preset edge gateway and according to the video capture requirements; and
a first send sub-unit configured for sending, according to the preset video capture mobile terminal identifier, the video capture access links to the preset video capture mobile terminal which is in a connection state with the preset edge gateway.

In an embodiment, the preset video capture mobile terminal is an edge mobile terminal device in the Internet of Things.

In an embodiment, it includes a plurality of the video capture requirements. The send unit 62 is specifically configured for generating the video capture access link corresponding to each of the video capture requirements in parallel according to each of the video capture requirements, where each of the video capture access links includes a corresponding video capture requirement.

In an embodiment, the receive unit 63 includes:
a verification sub-unit configured for receiving the target video, and verifying whether video data corresponding to the target video is security data based on a preset data security verification mode; and
a play sub-unit configured for playing the target videos if the video data is the security data.

In an embodiment, the video capture access link includes an original random code, and the verification sub-unit includes:
a first acquisition sub-unit configured for receiving the target videos, and acquiring the target random code carried by the video data corresponding to the target videos;
a judgement subunit configured for judging whether the target random code is consistent with the original random code; and
a decision subunit configured for deciding that the video data is security data if the target random code is consistent with the original random code.

It should be noted that a person skilled in the art would have been able to clearly understand that the above-mentioned video live-streaming apparatus and the specific implementation process of each unit can be referred to the corresponding description in the above-mentioned method embodiments. The description thereof will not be repeated here for the convenience and brevity of description.

Meanwhile, the division and connection mode of each unit in the above-mentioned video live-streaming apparatus are merely for illustration. In other embodiments, the video live-streaming apparatus may be divided into different units according to needs, and each unit in the video live-streaming apparatus may adopt different connection sequences and modes to complete all or part of the functions of the above-mentioned video live-streaming apparatus.

Figure 7:
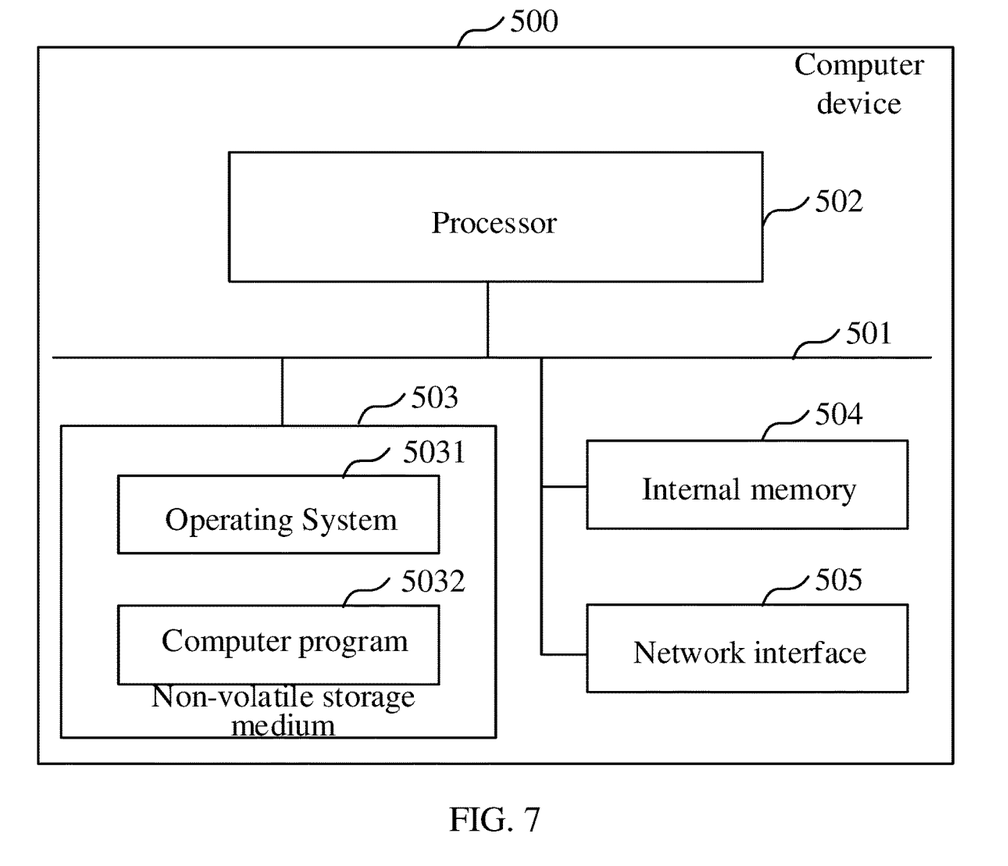
FIG. 7 is a schematic block diagram of a computer device provided by an embodiment of the present application.

The video live-streaming apparatus described above may be implemented in the form of a computer program which may be run on a computer device as shown in FIG. 7.

With reference to FIG. 7, FIG. 7 is a schematic block diagram of a computer device provided by an embodiment of the present application. The computer device 500 may be a computer device such as an edge gateway or may be a component or component of another device.

Referring to FIG. 7, the computer device 500 includes a processor 502, a memory, and a network interface 505 connected via a system bus 501. The memory may include a non-volatile storage medium 503 and an internal memory 504. The memory may also be a volatile storage medium.

The non-volatile storage medium 503 may store an operating system 5031 and a computer program 5032. The computer program 5032, when executed, may cause the processor 502 to perform one of the video live-streaming methods described above.

The processor 502 is used to provide computing and control capabilities to support the operation of the overall computer device 500.

The internal memory 504 provides an environment for the operation of the computer program 5032 in the non-volatile storage medium 503, which when executed by the processor 502, causes the processor 502 to perform one of the video live-streaming methods described above.

The network interface 505 is used for network communication with other devices. It will be appreciated by those skilled in the art that the structure shown in FIG. 7 is merely a block diagram of a portion of the structure relevant to the solution of the present application and does not constitute a limitation on the computer device 500 to which the solution of the present application applies. A specific computer device 500 may include more or less components than those shown in the figures, or may synthesize certain components, or may have a different arrangement of components. For example, in some embodiments, the computer device may include only a memory and a processor. In such embodiments, the structure and function of the memory and the processor are consistent with the embodiment shown in FIG. 7 and will not be described in detail herein.

Among them, the processor 502 is used for running a computer program 5032 stored in a memory so as to realize the steps of: determining, on the basis of an initial video, video capture information corresponding to a video that needs to be captured for the initial video, wherein the video capture information includes a preset video capture mobile terminal identifier and video capture requirements; a preset video capture mobile terminal corresponding to the preset video capture mobile terminal identifier and a capture terminal of the initial video are different terminals; generating, according to the video capture requirements, video capture access links corresponding to the video capture requirements, sending the video capture access links to the preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links; wherein the video capture access link includes the video capture requirements; and receiving the target videos, and playing the target videos.

In an embodiment, when the receiving the target videos and playing the target videos is realized, the processor 502 specifically realizes the steps of:

receiving the target videos, and synthesizing the target videos with the initial video to obtain a target live video, and then live-streaming the target live video.

In an embodiment, when realizing the generating, according to the video capture requirements, video capture access links corresponding to the video capture requirements, sending the video capture access links to the preset video capture mobile terminal according to the preset video capture mobile terminal identifier, the processor 502 specifically realizes the steps of:

generating the video capture access links corresponding to the video capture requirements based on a preset edge gateway and according to the video capture requirements; and sending, according to the preset video capture mobile terminal identifier, the video capture access links to the preset video capture mobile terminal which is in a connection state with the preset edge gateway.

In an embodiment, when the processor 502 realizes the sending the video capture access links to the preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links, the preset video capture mobile terminal is an edge mobile terminal device in the Internet of Things.

In an embodiment, including a plurality of the video capture requirements, the processor 502, when realizing the generating the video capture access links corresponding to the video capture requirements according to the video capture requirements, specifically realizes the steps of: generating the video capture access link corresponding to each of the video capture requirements in parallel according to each of the video capture requirements, where each of the video capture access links includes a corresponding video capture requirement.

In an embodiment, when the receiving the target videos and playing the target videos is realized, the processor 502 specifically realizes the steps of:

receiving the target video, and verifying whether video data corresponding to the target video is security data based on a preset data security verification mode; and if the video data is the security data, playing the target videos.

In an embodiment, the video capture access link includes an original random code. When realizing the receiving the target video and verifying whether video data corresponding to the target video is security data based on a preset data security verification mode, the processor 502 specifically realizes the steps of:

receiving the target videos, and acquiring the target random code carried by the video data corresponding to the target videos;

judging whether the target random code is consistent with the original random code; and if the target random code is consistent with the original random code, deciding that the video data is security data.

It should be understood that the processor 502 in this embodiment may be a central processing unit (CPU) or other general purpose processor, a digital signal processor (DSP), an application specific integrated circuit (ASIC), a field-programmable gate array (FPGA) or other programmable logic device, discrete gate or transistor logic device, discrete hardware components, etc. Here, the general purpose processor may be a microprocessor or the processor may be any conventional processor or the like.

It will be appreciated by those of ordinary skill in the art that all or a portion of the processes for implementing the above-described embodiments may be performed by a computer program stored on a computer-readable storage medium. The computer program is executed by at least one processor in the computer system to implement the flow steps of the embodiments of the method described above.

Accordingly, the present application also provides a computer-readable storage medium. The computer-readable storage medium may be a non-volatile computer-readable storage medium or a volatile computer-readable storage medium. The computer-readable storage medium stores a computer program which, when executed by a processor, causes the processor to implement the following contents. A computer program product which, when run on a computer, causes the computer to perform the steps of the video live-streaming method described in the embodiments above.

The computer-readable storage medium may be an internal storage unit of the aforementioned device, such as a hard disk or an internal storage of the device. The computer-readable storage medium may also be an external storage device of the device, such as a plug-in hard disk, a Smart Media Card (SMC), a Secure Digital (SD) card, a Flash Card, etc. equipped with the device. Further, the computer-readable storage medium may also include both an internal storage unit and an external storage device for the device.

It will be obvious to a person skilled in the art that, for the convenience and brevity of the description, specific working procedures of the above described devices, apparatuses and units may be referred to corresponding procedures in the preceding method embodiments and will not be described in detail here.

The storage medium is a physical, non-transitory storage medium, and may be various physical storage media, for example, a U disk, a mobile hard disk drive, a Read-Only Memory (ROM), a magnetic disk or an optical disk, etc. which can store a computer program.

Those skilled in the art will appreciate that the elements and algorithm steps of the embodiments described in connection with the embodiments disclosed herein may be implemented as electronic hardware, computer software, or combinations of both, and that the elements and steps of the examples have been described above generally in terms of their functions in order to clearly illustrate this interchangeability of hardware and software. Whether such functionality is implemented as hardware or software depends upon the particular application and design constraints imposed on the implementation. Those skilled in the art may implement the described functions in varying ways for each particular application, but such implementations should not be interpreted as causing a departure from the scope of the present application.

In the several embodiments provided herein, it should be understood that the disclosed apparatus and method may be implemented in other ways. For example, the apparatus embodiments described above are merely illustrative. For example, the division of each unit is merely a logic function division, and there may be other division modes in actual implementation. For example, multiple elements or components may be combined or integrated into another system, or some features may be omitted, or not performed.

The steps in the method of the embodiments of the present application may be sequentially adjusted, combined and deleted according to actual needs. The units in the apparatus in the embodiments of the present application may be combined, divided and deleted according to actual needs. In addition, each functional unit in each embodiment of the present application may be integrated in one processing unit, or may be physically present separately from each unit. Two or more units may be integrated in one unit.

The integrated unit, if implemented in the form of a software functional unit and sold or used as a stand-alone product, may be stored in a storage medium. Based on this understanding, the solution of the present application may be essentially or a part of making a contribution to the prior art or a whole or part of the solution may be embodied in the form of a software product that is stored in a storage medium and that includes instructions for causing an electronic device (which may be a personal computer, a terminal, or a network device, etc.) to perform all or part of the steps of the methods of the various embodiments of the present application.

The applicant states that the above-mentioned content is only detailed description of the present application, but the scope of protection of the present application is not limited thereto. Any equivalent modifications and substitutions which can be easily made by those skilled in the art within the technical scope of the disclosure disclosed are included in the scope of protection the present application. Therefore, the scope of protection of the present application shall be subject to the scope of protection of the claims.

What is claimed is:

1. A video live-streaming method, comprising:
   determining, on the basis of an initial video, video capture information corresponding to a video that needs to be captured for the initial video, wherein the video capture information comprises a preset video capture mobile terminal identifier and video capture requirements; a preset video capture mobile terminal corresponding to the preset video capture mobile terminal identifier and a capture terminal of the initial video are different terminals;
   generating, according to the video capture requirements, video capture access links corresponding to the video capture requirements, sending the video capture access links to the preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links; wherein the video capture access link comprises the video capture requirements; and
   receiving the target videos, and playing the target videos.

2. The video live-streaming method according to claim 1, wherein the receiving the target videos and playing the target videos comprises:
   receiving the target videos, and synthesizing the target videos with the initial video to obtain a target live video, and then live-streaming the target live video.

3. The video live-streaming method according to claim 1, wherein the generating, according to the video capture requirements, video capture access links corresponding to the video capture requirements, sending the video capture access links to the preset video capture mobile terminal according to the preset video capture mobile terminal identifier comprises:
   generating the video capture access links corresponding to the video capture requirements based on a preset edge gateway and according to the video capture requirements; and
   sending, according to the preset video capture mobile terminal identifier, the video capture access links to the preset video capture mobile terminal which is in a connection state with the preset edge gateway.

4. The video live-streaming method according to claim 1, wherein the preset video capture mobile terminal is an edge mobile terminal device in the Internet of Things.

5. The video live-streaming method according to claim 1, comprising a plurality of the video capture requirements, wherein the generating the video capture access links corresponding to the video capture requirements according to the video capture requirements comprises:
   generating the video capture access link corresponding to each of the video capture requirements in parallel according to each of the video capture requirements, wherein each of the video capture access links comprises a corresponding video capture requirement.

6. The video live-streaming method according to claim 1, wherein the receiving the target videos and playing the target videos comprises:

receiving the target video, and verifying whether video data corresponding to the target video is security data based on a preset data security verification mode; and if the video data is the security data, playing the target videos.

7. The video live-streaming method according to claim 6, wherein the video capture access link comprises an original random code, and the receiving the target video and verifying whether video data corresponding to the target video is security data based on a preset data security verification mode comprises:

receiving the target videos, and acquiring the target random code carried by the video data corresponding to the target videos;

judging whether the target random code is consistent with the original random code; and if the target random code is consistent with the original random code, deciding that the video data is security data.

8. A computer device, wherein the computer device comprises a memory and a processor connected to the memory; the memory is used for storing computer programs; the processor is used for executing the computer programs to perform the steps of:

determining, on the basis of an initial video, video capture information corresponding to a video that needs to be captured for the initial video, wherein the video capture information comprises a preset video capture mobile terminal identifier and video capture requirements; a preset video capture mobile terminal corresponding to the preset video capture mobile terminal identifier and a capture terminal of the initial video are different terminals;

generating, according to the video capture requirements, video capture access links corresponding to the video capture requirements, sending the video capture access links to the preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links; wherein the video capture access link comprises the video capture requirements; and receiving the target videos, and playing the target videos.

9. The computer device according to claim 8, wherein the receiving the target videos and playing the target videos comprises:

receiving the target videos, and synthesizing the target videos with the initial video to obtain a target live video, and then live-streaming the target live video.

10. The computer device according to claim 8, wherein the generating, according to the video capture requirements, video capture access links corresponding to the video capture requirements, sending the video capture access links to the preset video capture mobile terminal according to the preset video capture mobile terminal identifier comprises:

generating the video capture access links corresponding to the video capture requirements based on a preset edge gateway and according to the video capture requirements; and sending, according to the preset video capture mobile terminal identifier, the video capture access links to the preset video capture mobile terminal which is in a connection state with the preset edge gateway.

11. The computer device according to claim 8, wherein the preset video capture mobile terminal is an edge mobile terminal device in the Internet of Things.

12. The computer device according to claim 8, comprising a plurality of the video capture requirements, wherein the generating the video capture access links corresponding to the video capture requirements according to the video capture requirements comprises:

generating the video capture access link corresponding to each of the video capture requirements in parallel according to each of the video capture requirements, wherein each of the video capture access links comprises a corresponding video capture requirement.

13. The computer device according to claim 8, wherein the receiving the target videos and playing the target videos comprises:

receiving the target video, and verifying whether video data corresponding to the target video is security data based on a preset data security verification mode; and if the video data is the security data, playing the target videos.

14. The computer device according to claim 13, wherein the video capture access link comprises an original random code, and the receiving the target video and verifying whether video data corresponding to the target video is security data based on a preset data security verification mode comprises:

receiving the target videos, and acquiring the target random code carried by the video data corresponding to the target videos;

judging whether the target random code is consistent with the original random code; and if the target random code is consistent with the original random code, deciding that the video data is security data.

15. A computer-readable storage medium, wherein the computer-readable storage medium has stored thereon computer programs which, when executed by a processor, implement the steps of:

determining, on the basis of an initial video, video capture information corresponding to a video that needs to be captured for the initial video, wherein the video capture information comprises a preset video capture mobile terminal identifier and video capture requirements; a preset video capture mobile terminal corresponding to the preset video capture mobile terminal identifier and a capture terminal of the initial video are different terminals;

generating, according to the video capture requirements, video capture access links corresponding to the video capture requirements, sending the video capture access links to the preset video capture mobile terminal according to the preset video capture mobile terminal identifier, such that the preset video capture mobile terminal accesses, on the basis of the video capture access links, a video live-streaming system to which the initial video belongs, captures, according to the video capture requirements, target videos corresponding to the video capture requirements, and returns the target videos on the basis of the video capture access links; wherein the video capture access link comprises the video capture requirements; and receiving the target videos, and playing the target videos.

16. The computer-readable storage medium according to claim 15, wherein the receiving the target videos and playing the target videos comprises:
- receiving the target videos, and synthesizing the target videos with the initial video to obtain a target live video, and then live-streaming the target live video.

17. The computer-readable storage medium according to claim 15, wherein the generating, according to the video capture requirements, video capture access links corresponding to the video capture requirements, sending the video capture access links to the preset video capture mobile terminal according to the preset video capture mobile terminal identifier comprises:
- generating the video capture access links corresponding to the video capture requirements based on a preset edge gateway and according to the video capture requirements; and
- sending, according to the preset video capture mobile terminal identifier, the video capture access links to the preset video capture mobile terminal which is in a connection state with the preset edge gateway.

18. The computer-readable storage medium according to claim 15, wherein the preset video capture mobile terminal is an edge mobile terminal device in the Internet of Things.

19. The computer-readable storage medium according to claim 15, comprising a plurality of the video capture requirements, wherein the generating the video capture access links corresponding to the video capture requirements according to the video capture requirements comprises:
- generating the video capture access link corresponding to each of the video capture requirements in parallel according to each of the video capture requirements, wherein each of the video capture access links comprises a corresponding video capture requirement.

20. The computer-readable storage medium according to claim 15, wherein the receiving the target videos and playing the target videos comprises:
- receiving the target video, and verifying whether video data corresponding to the target video is security data based on a preset data security verification mode; and
- if the video data is the security data, playing the target videos.

* * * * *